(12) United States Patent
Alvarado

(10) Patent No.: US 10,100,803 B1
(45) Date of Patent: Oct. 16, 2018

(54) OCEAN WAVE-CREST POWERED ELECTRICAL GENERATOR IN COMBINATION WITH PUMPED STORAGE

(71) Applicant: Alfredo Alvarado, Bogota (CO)

(72) Inventor: Alfredo Alvarado, Bogota (CO)

( * ) Notice: Subject to any disclaimer, the term of this patent is extended or adjusted under 35 U.S.C. 154(b) by 0 days.

(21) Appl. No.: 15/258,290

(22) Filed: Sep. 7, 2016

(51) Int. Cl.
*F03B 13/22* (2006.01)
*H02K 7/18* (2006.01)
*F01D 15/10* (2006.01)
*F03B 13/06* (2006.01)
*F03B 3/10* (2006.01)
*F04D 13/06* (2006.01)

(52) U.S. Cl.
CPC .............. *F03B 13/22* (2013.01); *F01D 15/10* (2013.01); *F03B 3/10* (2013.01); *F03B 13/06* (2013.01); *F04D 13/06* (2013.01); *H02K 7/1823* (2013.01)

(58) Field of Classification Search
CPC .. F03B 13/14; F03B 13/22; F03B 3/10; F01D 15/10; F04D 13/06
USPC .......................................................... 290/52
See application file for complete search history.

(56) References Cited

U.S. PATENT DOCUMENTS

| | | | |
|---|---|---|---|
| 3,644,052 A * | 2/1972 | Lininger | F03B 13/141 415/124.1 |
| 3,883,261 A * | 5/1975 | Saxmann | F03D 3/0463 415/202 |
| 4,023,041 A | 5/1977 | Chappell | |
| 4,034,231 A | 7/1977 | Conn et al. | |
| 4,104,536 A * | 8/1978 | Gutsfeld | F03B 17/063 290/54 |
| 4,179,886 A | 12/1979 | Tsubota | |
| 4,359,868 A | 11/1982 | Slonim | |
| 4,436,480 A * | 3/1984 | Vary | F03B 7/00 415/211.1 |
| 4,467,218 A * | 8/1984 | Andruszkiw | F03B 17/063 290/42 |
| 4,781,023 A | 11/1988 | Gordon | |
| 4,803,839 A | 2/1989 | Russo, III | |
| 5,789,826 A | 8/1998 | Kumbatovic | |
| 5,808,368 A | 9/1998 | Brown | |
| 5,986,349 A | 11/1999 | Eberle | |
| 6,133,644 A | 10/2000 | Smith et al. | |
| 6,711,897 B2 | 3/2004 | Lee | |

(Continued)

*Primary Examiner* — Sean Gugger
(74) *Attorney, Agent, or Firm* — Mark D. Bowen; Malin Haley DiMaggio & Bowen, P.A.

(57) ABSTRACT

An ocean wave-crest powered electrical generator comprises a buoyant vessel anchored to the sea floor by mooring chains. The vessel defines a substantial opening at the bow leading to a paddle wheel such that ocean wave crests flow past the paddle wheel while passing through the generator thereby capturing the power of the continuous wave crests passing through the bow opening. The paddle wheel transforms energy from the breaking wave crests into kinetic energy that in turn activates an electric power generator. The wave crest electrical generator is permanently moored near the beach and allowed to rise and fall with the tide thus allowing for a continuous flow of ocean waves to be converted into power. Pumped storage provides a sustained flow of energy that is easy to regulate and this can be accomplished in combination with "energetic marinas" by constructing a reservoir on top of a near-by cliff, hill or tall building.

2 Claims, 7 Drawing Sheets

(56) References Cited

U.S. PATENT DOCUMENTS

| | | | | |
|---|---|---|---|---|
| 7,696,633 B2* | 4/2010 | Zajchowski | ............ | F03B 17/063 |
| | | | | 290/43 |
| 8,841,793 B2* | 9/2014 | Wang | ................... | F03B 13/10 |
| | | | | 290/43 |
| 9,534,579 B2* | 1/2017 | Van Rompay | ......... | F03B 17/063 |
| 2005/0173927 A1* | 8/2005 | Aukon | ................. | H02K 7/1823 |
| | | | | 290/43 |
| 2011/0173976 A1* | 7/2011 | Meadon | ................. | F03B 7/003 |
| | | | | 60/639 |
| 2012/0134790 A1* | 5/2012 | Fiske | ................... | F03D 9/026 |
| | | | | 415/182.1 |
| 2012/0274070 A1* | 11/2012 | Payre | ................... | F03B 13/06 |
| | | | | 290/52 |
| 2015/0056085 A1* | 2/2015 | Fiske | ................... | F03B 13/06 |
| | | | | 417/313 |
| 2015/0252776 A1* | 9/2015 | Van Rompay | ......... | F03B 17/063 |
| | | | | 290/54 |
| 2016/0017558 A1* | 1/2016 | French, Sr. | ............. | E02B 8/085 |
| | | | | 405/81 |
| 2016/0341173 A1* | 11/2016 | Coulon | ................... | F03B 3/10 |
| 2017/0074232 A1* | 3/2017 | Shin | ......................... | F03B 7/00 |

* cited by examiner

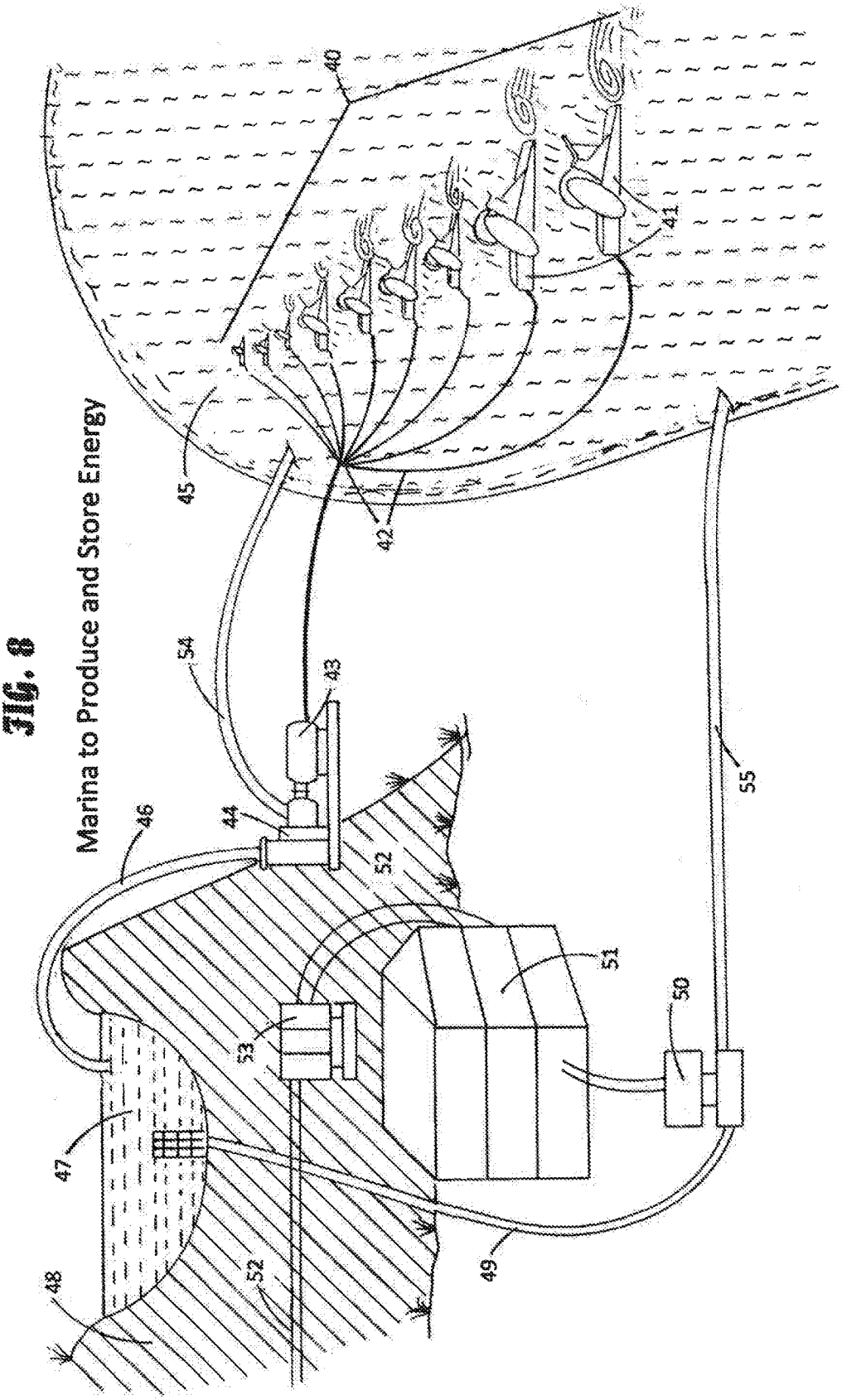

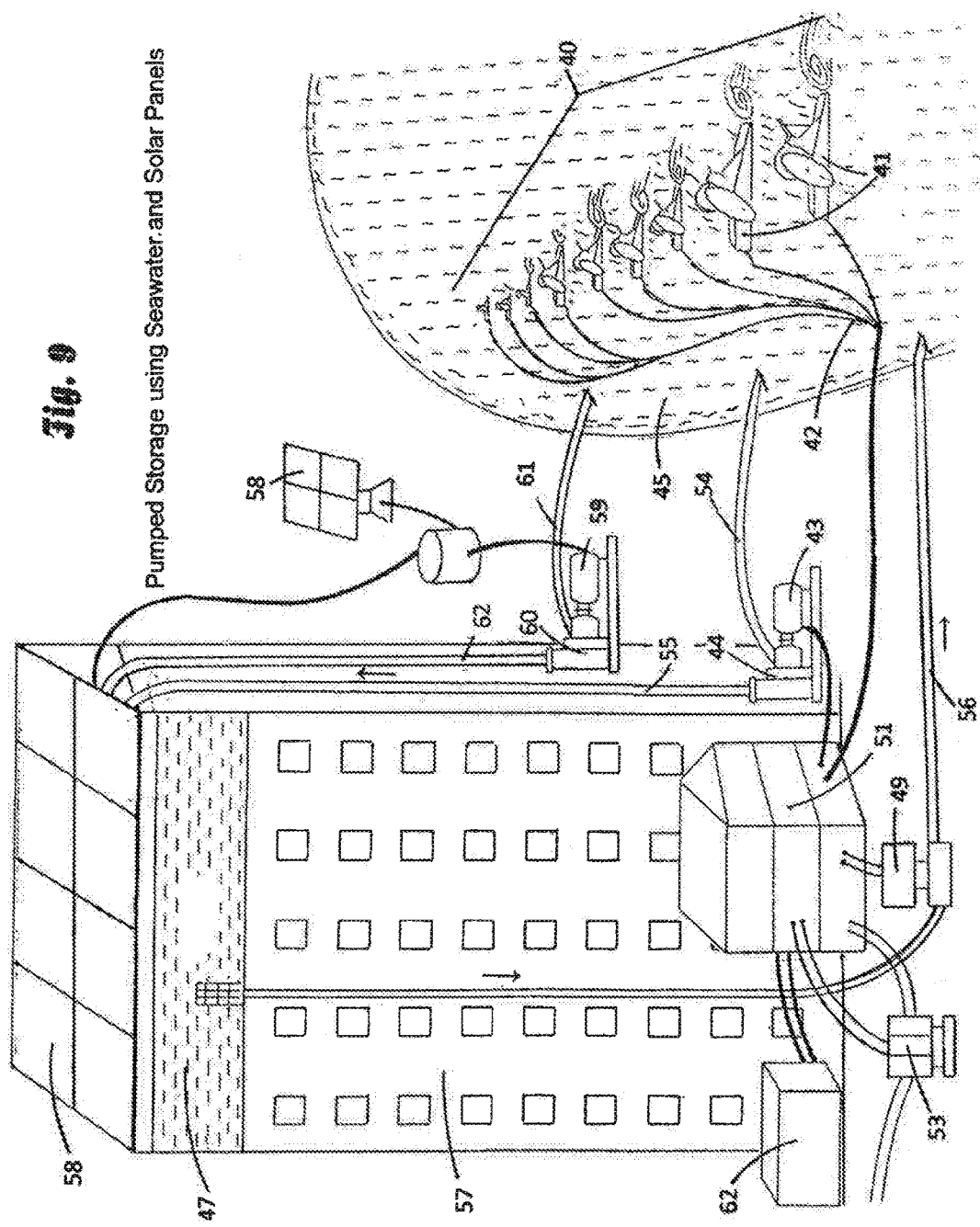

OCEAN WAVE-CREST POWERED ELECTRICAL GENERATOR IN COMBINATION WITH PUMPED STORAGE

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates to a floating vessel that converts the power of the ocean wave crests into electric power. This vessel is provided with a paddle wheel configured to capture energy from ocean waves, particularly energy from the wave crest, and transforms the wave energy to kinetic energy which in turn drives an electric power generator. The floating vessel is permanently moored near a beach and raises and falls with the ocean tides thus allowing for the continuous capture and conversion of ocean wave crest energy.

2. Description of Related Art

Ocean waves contain an enormous amount of hydro-energy which can be converted into useful energy such as electric power. It has been estimated that the total power of waves breaking on the world's coastlines is approximately 2-3 million MW (1 MW=1 million watts), and that 0.1% of that energy would be capable of supplying the entire world's energy requirements. Wave energy is recognized to contain the highest energy density among renewable energy sources and is virtually inexhaustible. In practical terms, water has power density that is 832 times greater than the power density of air. Specifically, the density of water is 1.25 Kg per cubic meter, whereas the density of dry air at sea level is about 1/800th of the density of water. Moreover, unlike wind, the wave climate is more predictable and is generally less intermittent. This enormous power can be perceived by a beach bather at the moment he is being hit by an ocean wave crest; such power may be avoided by jumping over the wave crest or submerging one's self under the crest. This simple experiment illustrates that the power of the wave is in the crest, not in the wave itself.

Commercially available ocean wave electric generators can be classified into two large groups: fixed structures and buoyant/floating devices. Fixed structures include hydrostatic pressure structures and fixed water wheels. Buoyant or floating devices include shoreline installations, near shoreline installations, and open ocean devices.

The prior art reveals a number of advancements directed to capture the hydro-power of wave crests and transform such power into usable electrical energy. Shoreline installations comprise various devices which employ boom or float systems, as disclosed in U.S. Pat. No. 5,789,826 issued to Kumbatovic, U.S. Pat. No. 6,133,644 issued to Smith et al., and U.S. Pat. No. 6,711,897 issued to Lee. Further, U.S. Pat. No. 3,644,052 issued to Lininger describes a paddle wheel that is rotated in the same direction by both the incoming wave and the receding wave for continuously rotating a propeller shaft by means of a platform and catch basin. The whole structure is mounted on wheels and tracks extending from a beach on which the unit is mounted to the water so as to permit movement of said unit toward and away from the beach. Additionally, U.S. Pat. No. 4,023,041 issued to Chappell describes an apparatus for generating electricity that uses floating barges mounted for free rotation about a fixed pivot.

Near shoreline installations are devices that are typically situated in 10-25 meters of water near the shore, and include installations with foundations on the bottom such as those described in U.S. Pat. No. 4,034,231 issued to Conn et al, U.S. Pat. No. 5,808,368 issued to Brown, and U.S. Pat. No. 4,781,023 issued to Gordon. These near shoreline devices are generally massive in size and tend to disrupt the shoreline environment.

Open ocean devices include platforms or largely submerged devices such as those described in U.S. Pat. No. 4,359,868 issued to Slonim, U.S. Pat. No. 4,803,839 issued to Russo III, U.S. Pat. No. 5,986,349 issued to Eberle, and U.S. Pat. No. 4,179,886 issued to Tsubota. These devices tend to dampen the surface waves because of their mass. A further example of this technology is the Pelamis wave-energy project in Portugal that ultimately resulted in failure due to technical and financial problems.

The references of the background art are burdened by limitations and disadvantages that have limited widespread acceptance and use. Among the disadvantages present in the disclosures of the background art is the oversized devices, high manufacturing and operating costs, inefficient conversion of wave energy to electrical energy, objectionable appearance from the shoreline, and the disruption of the marine environment and navigational waterways. Another limitation of the electric generators is that the continuous energy they produce needs to be stored in some way.

Accordingly, there remains a need for improvements in the field of capturing and transforming renewable energy resources, specifically wave-energy, into usable energy. There further exists a need for such a system capable of accomplishing this task without high operating costs, contributing to pollution of the environment, disruption of marine life or damaging shoreline views, or other disadvantages present in the art.

BRIEF SUMMARY OF THE INVENTION

The present invention overcomes the limitations and disadvantages present in the art by providing an apparatus and method for generating usable energy from ocean wave crests. An ocean wave-crest powered electrical generator in accordance with the present invention generally comprises a buoyant apparatus or vessel anchored to the sea floor by mooring chains. A substantial opening upon the bow leads to a paddle wheel and allows for ocean wave crests to flow through the generator thereby transforming renewable hydro energy into electrical energy by capturing the power of the continuous wave crests passing through the bow opening.

The paddle wheel transforms energy from the breaking wave crests into kinetic energy that in turn activates an electric power generator. The wave crest electrical generator is permanently moored near the beach and allowed to rise and fall with the tide thus allowing for a continuous flow of ocean waves to be converted into power.

The present invention further addresses storing the energy produced by using pumped storage. In this particular case, seawater is used because it is available in an inexhaustible manner. Pumped storage provides a sustained flow of energy that is easy to regulate and this can be accomplished in combination with "energetic marinas" by constructing a reservoir on top of a near-by cliff, hill or tall building. Pumping seawater into this reservoir is the cheapest way to store energy that accommodates to the variable production of wind, ocean and solar power. Pumped storage has many advantages over other methods of storage due to its high capacity and lower costs.

The present invention can be used in combination with pumped storage by installing an "energetic marina" composed of 10 or more ocean wave-crest generator vessels that are moored in 10-25 meters of water near the shoreline. The energy they produce is transmitted through a submarine cable that will drive a water pump destined to pump seawater to the reservoir. Then, the seawater accumulated in this reservoir is used, as a gravitational force, through a penstock, to propel a high efficiency electrical turbine that will send electric flow to a Control Center where this flow will be distributed to near-by homes. The water pump will keep supplying the reservoir continuously so it will not be depleted. In this way the reservoir acts like a battery storing power in the form of seawater. Part of the electricity produced by the generators can be used to accumulate energy employing lead-acid batteries or more expensive sulfur-sodium batteries. Another alternative is to build a backup generator in case of failure of the whole system. Obviously, the efficiency of this arrangement depends on the head of the water turbine and the capacity of the reservoir. The proposed plan is to provide continuous electricity by using cheap, renewable and clean source of energy, and the technology involved is realistic and readily available.

Accordingly, it is an object of the present invention to provide an improved ocean wave crest powered electrical generator.

Another object of the present invention is to provide such a system which utilizes a renewable energy source which can be cost effectively and easily transformed into electrical energy.

Another object of the present invention is to provide a high-output of usable energy, as compared to solar or wind energy.

Yet another object of the present invention is to provide an air pollution-free and noise pollution-free way to transform renewable energy into a usable form.

Another object of the present invention is that the generator does not interfere with marine life nor water front views of the coastline, nor does it pose a significant threat to marine navigation.

Finally, another object of the present invention is that the energy produced by the ocean wave-crest generators can be used in combination with a pumped storage system so the combined arrangement will provide continuous flow of electricity.

In accordance with these and other objects, which will become apparent hereinafter, the instant invention will now be described with particular reference to the accompanying drawings.

BRIEF DESCRIPTION OF THE DRAWINGS

FIG. 8 is a proposed scheme of an "energetic marina" in combination with a pumped storage system using a reservoir build on top of a hill; and FIG. 9 is a proposed scheme of an "energetic marina" in combination with a pumped storage system using a reservoir build on top of a building.

DETAILED DESCRIPTION OF THE INVENTION

Figure 1:
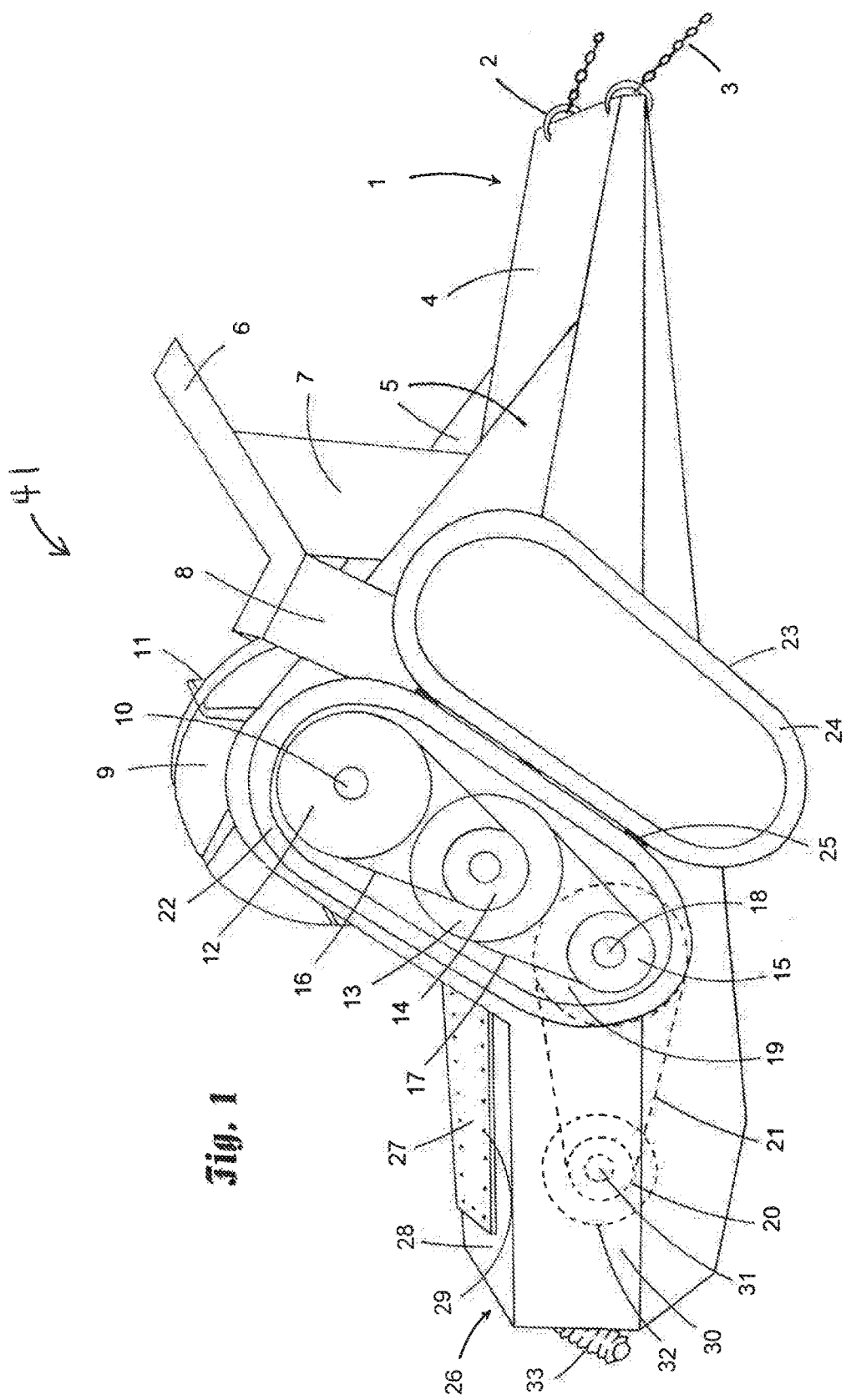
FIG. 1 is a starboard side view of the ocean wave crest generator in accordance with the present invention, with an access door shown in an open configuration.
Figure 2:
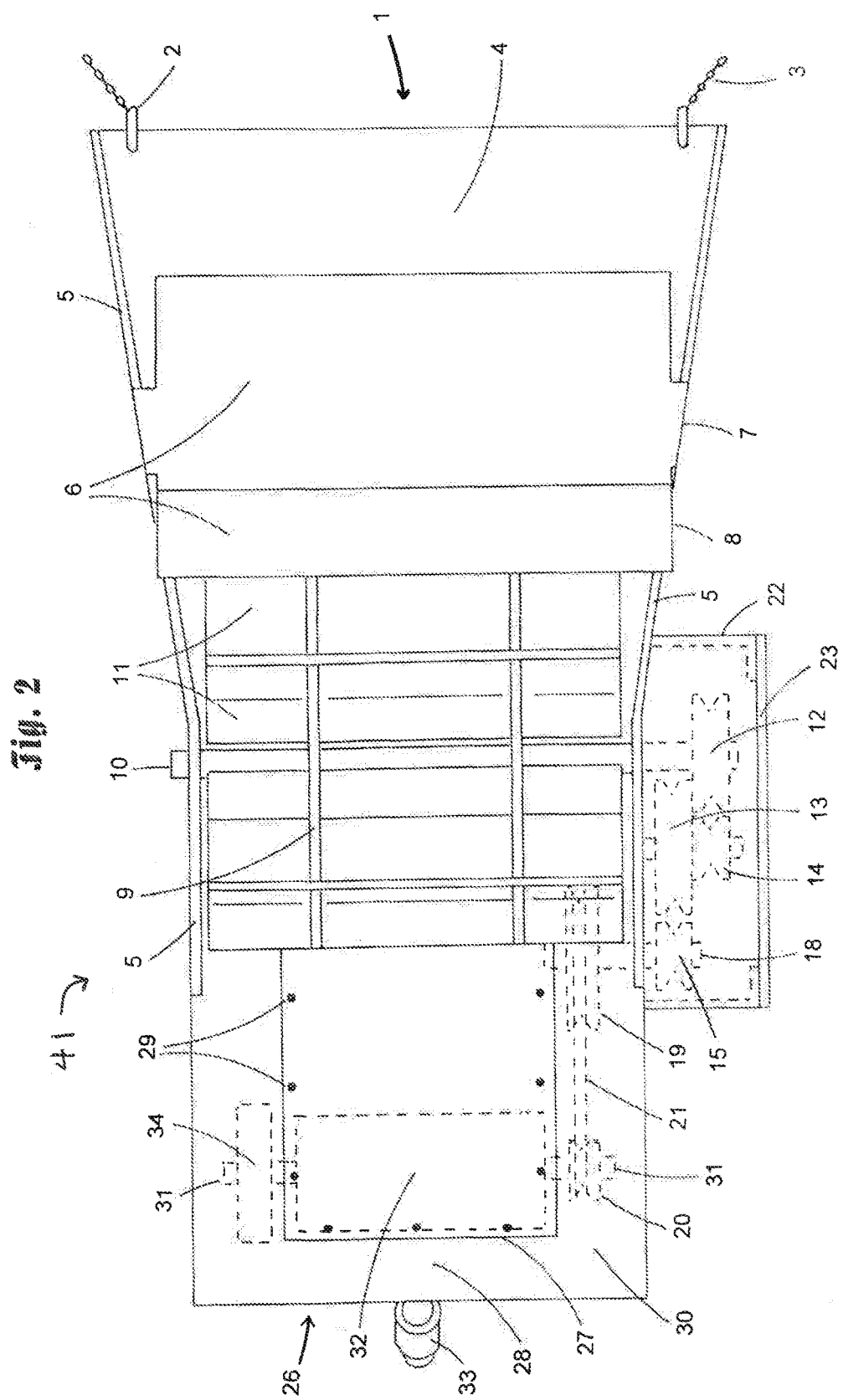
FIG. 2 is a top view of the ocean wave crest generator.

With reference now to the drawings, FIGS. 1-9 depict an ocean wave crest electrical generator, generally referenced as 41, in accordance with the present invention. As shown in FIGS. 1 and 2, ocean wave crest generator 41 includes a buoyant apparatus or vessel that is anchored to the ocean floor with bow shackles 2 and mooring chains 3. Apparatus 41 is typically anchored such that bow portion 1, that is oriented toward incoming waves so as to receive wave crests thereon. The bow 1 includes an intake ramp 4, side panels 5 and deflective panel 6, which are connected to and supported by leg 7 and leg 8, thereby directing the flow of ocean wave crests onto a paddle wheel 9 rotatably mounted to generator vessel 41. Paddle wheel 9 rotates about the power shaft 10 by use of paddles 11. Power shaft 10 forces rotation of gear pulleys 12, 13, 14, and 15. As best seen in FIG. 1, pulleys 12, 13, and 14 are connected with v-belt 16, and pulleys 13, 14, and 15 are connected with v-belt 17. Lower pulley 15 is connected to shaft 18 which is connected to an interior pulley 19 which is in turn connected to generator pulley 20 by v-belt 21.

In a preferred embodiment, the gear mechanisms are protected from outside elements by enclosure 22, which may be attached to side panels 5 and is rendered watertight by gasket 24 on the inner side of access door 23, which is shown in the open position in FIG. 1. Door 23 is attached to enclosure 22 by hinges 25. Stem section shown generally as 26 includes deck cover 27 which is attached to the deck 28 with bolts 29 to form a watertight internal compartment 30. Compartment 30 houses electrical generator 32, which is rotated by shaft 31. As best illustrated in FIG. 2, a fly wheel 34 may further be incorporated to maintain the inertial motion created by generator 32. Stern 26 further includes an outlet 33 through which a marine electrical cable (not shown in FIG. 1) may be routed to transfer electrical power generated by generator 32 to an on-shore facility.

Figure 3:
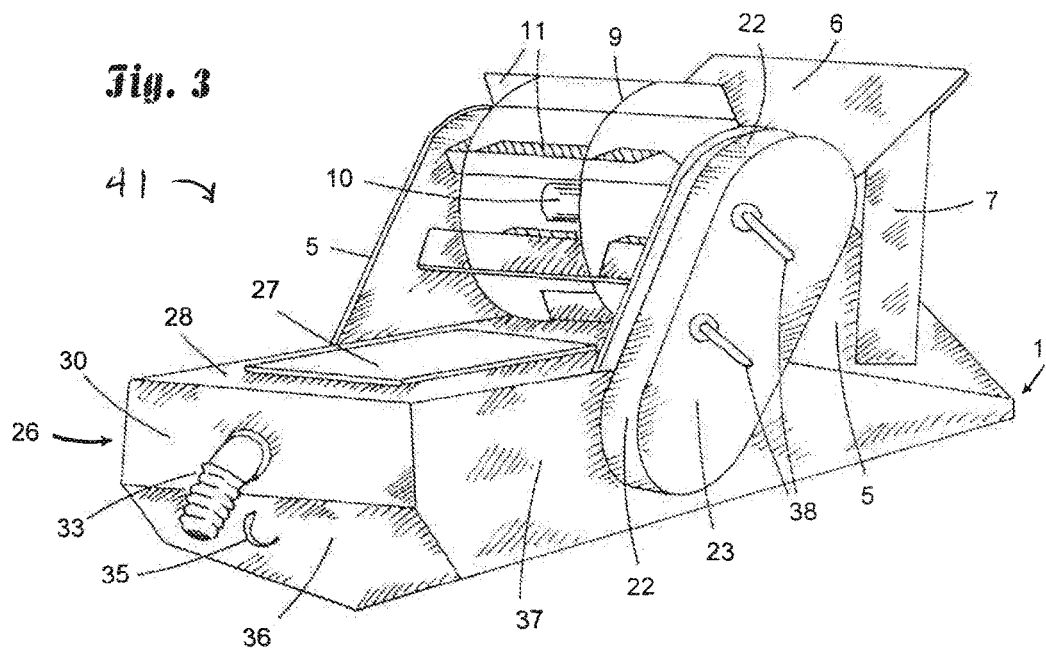
FIG. 3 is a perspective view of the stern and starboard of the ocean wave crest generator.

FIG. 3 is a perspective view of an ocean wave crest generator 41 showing the bow section, generally referenced as 1, which includes a side panel 5 and deflection support panel 6 supported by leg 7. Protective enclosure 22 is disposed on the starboard side of the vessel hull 37 and is watertight by means of access door 23 with its corresponding latches 38. The mid-section of the generator vessel 41 includes a paddle wheel 9 with corresponding paddles 11 connected to power shaft 10. The aft or stern section 26 shows deck cover 27 secured in place to deck 28, and also outlet 33 and stern shackle 35. V-shaped bottom 36 is designed to give more stability to the vessel.

Figure 4:
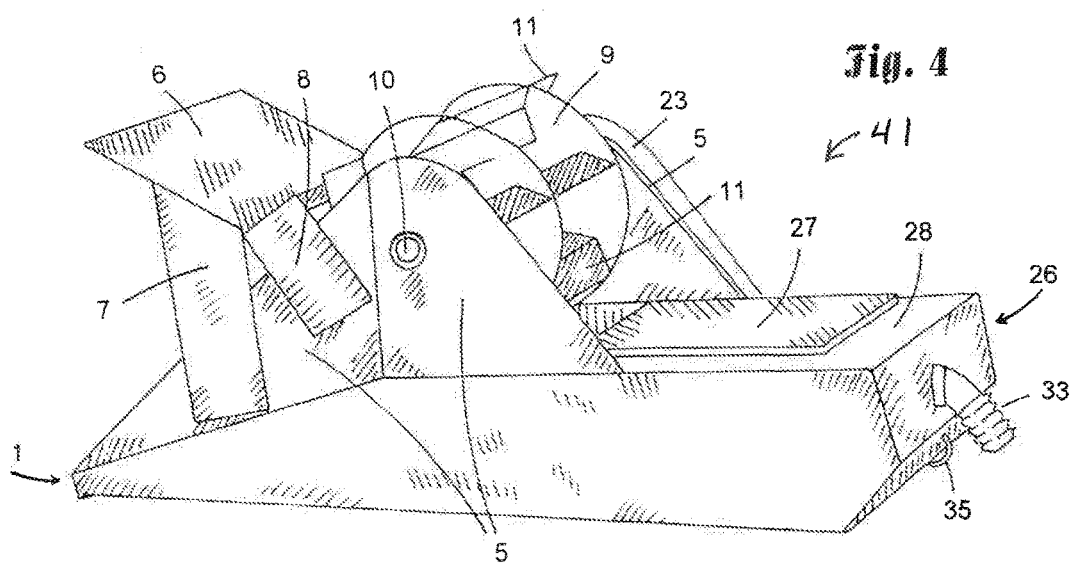
FIG. 4 is a perspective view of the stern and port of the ocean wave crest generator.

FIG. 4 is a perspective rendition of the ocean wave crest generator displaying the external components of the aft, port, and bow sections. The bow section 1 includes deflective panel 6 supported by legs 7 and 8 which are attached to side panel 5. The mid-section of the vessel 41 includes a paddle wheel 9 having paddles 11 working in unity with power shaft 10. Aft-section 26 includes deck cover 27 fastened to the top of deck 28, and further includes a projecting marine electrical cable outlet 33, and stern shackle 35.

Figure 5:
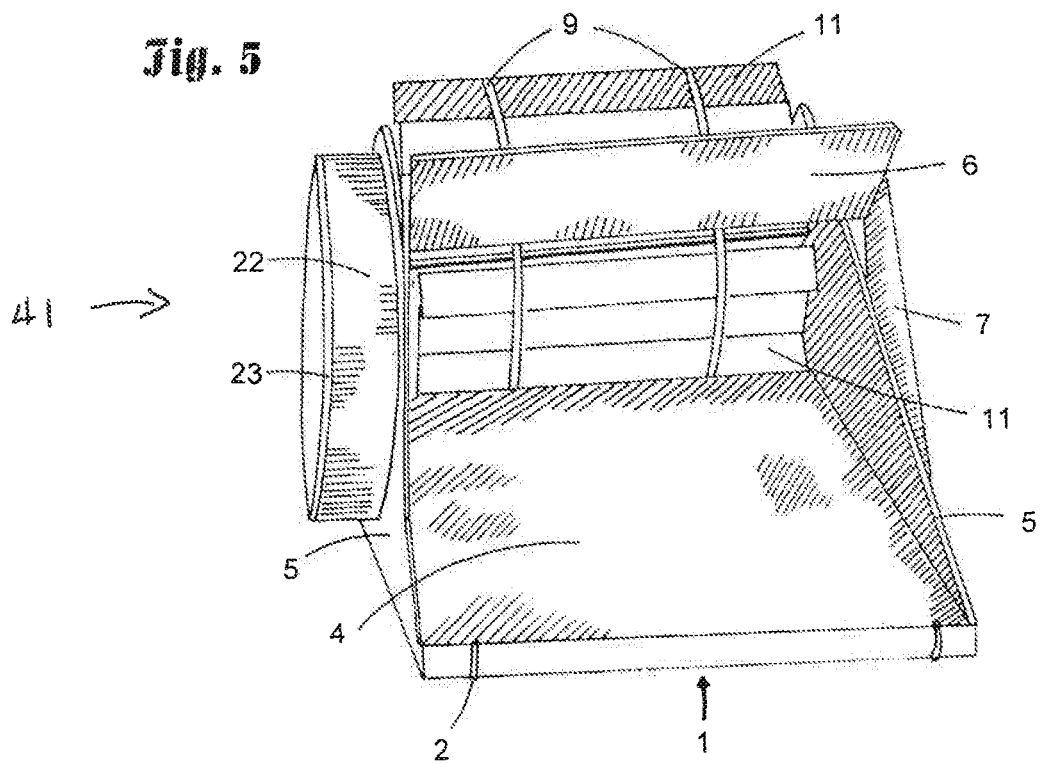
FIG. 5 is a perspective view of the bow of the ocean wave crest generator.

FIG. 5 illustrates the forward section 1 of generator vessel 41 with two bow shackles 2 and a wide inlet ramp 4 sized and shaped to channel the incoming waves in conjunction with side panels 5 and deflective panel 6. Paddle wheel 9 is positioned such that paddles 11 are exposed at the lower portion thereof to receive the impact of the incoming waves.

Figure 6:
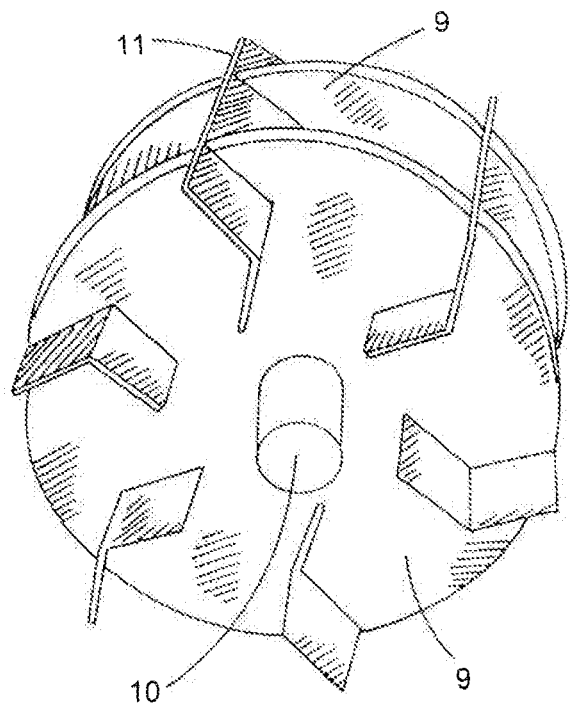
FIG. 6 is a perspective view of the paddle wheel of the ocean wave crest generator.
Figure 7:
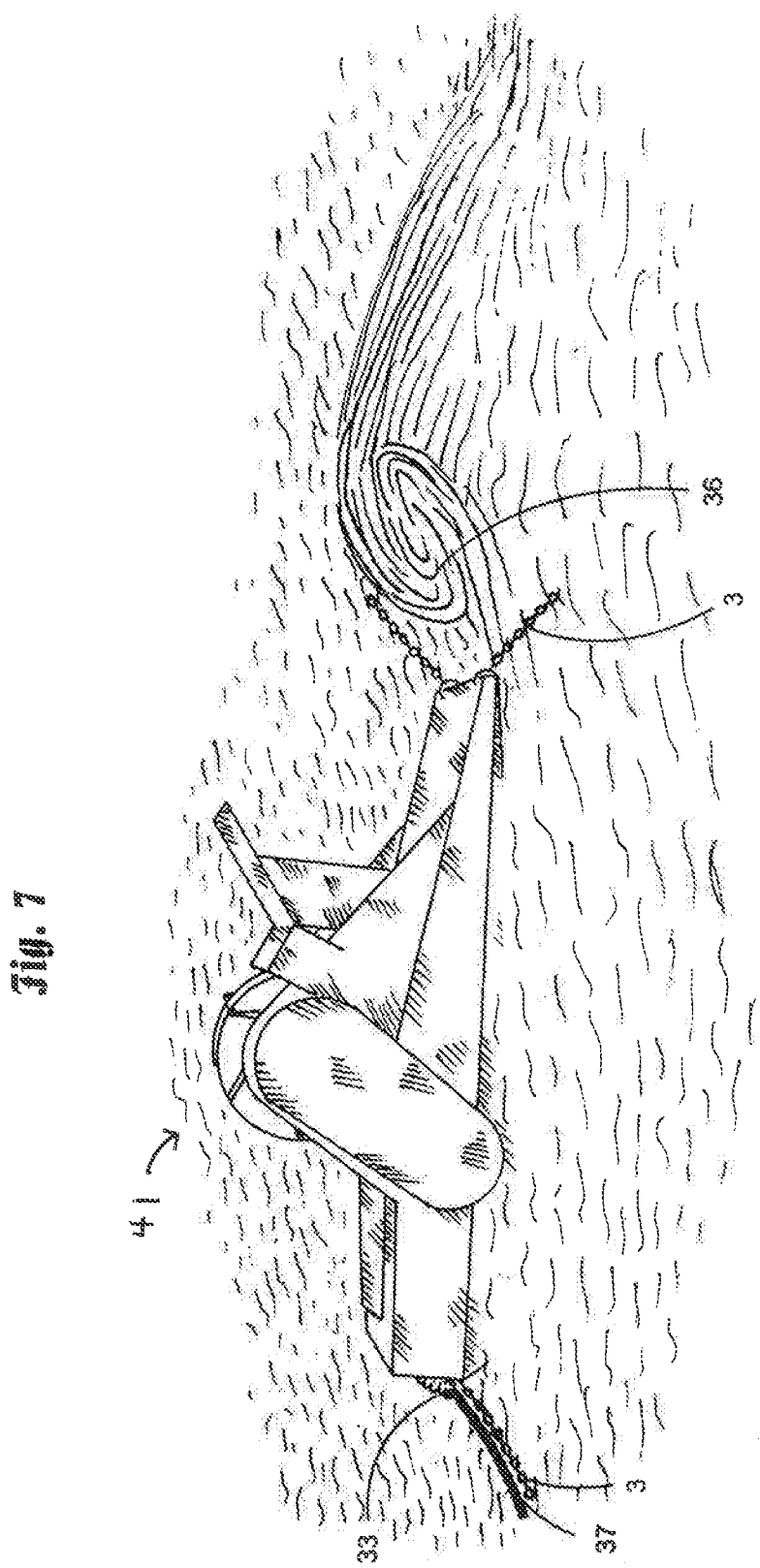
FIG. 7 is a panoramic view of the ocean wave crest generator anchored on the beach bottom while receiving an incoming ocean wave.

A significant aspect of the present invention involves providing a unique paddle wheel configuration with angulated blades. As best seen in FIG. 6, paddle wheel 9 features six angulated paddles 11 designed to efficiently capture the incoming wave crests. As waves break over the bow 1 of generator vessel 41, they come into contact with the paddle blades disposed on the lower portion of wheel 9, wherein the radially outer portion of the lowest blade form a generally vertical surface and the radially inner portion of the lowest blade forms a forwardly angled surface, which surfaces combine to trap the wave thereby maximizing the transfer of energy. FIG. 7 depicts a panoramic view of the ocean wave crest generator is shown floating in the water and moored with anchor chains 3 and positioned to receive an incoming wave crest 36. A marine electric cable 37 is shown coming out of stern outlet 33.

FIG. 8 depicts a panoramic view of an "energetic marina" 40, composed of a number of electric generator vessels 41, and connected to a number of submarine cables 42 that provides electricity to a motor 43 coupled with a water pump 44 that will send seawater 45, through a pipe 46, to a reservoir 47 constructed on top of a near-by hill 48. This reservoir will provide seawater through a penstock 49 to a water turbine-generator 50 which will generate electricity and this electricity will be processed in a Control Center 51 that will distribute electricity to the power lines 52 and to a transformer 53. The seawater 45 will be withdrawn through an intake pipe 54, and the water turbine-generator 50 will discharge the sea water through an outflow pipe 55 into the sea.

FIG. 9 is a scheme showing an "energetic marina" 40, composed of a number of electric generator vessels 41, that generates electricity which is transmitted through a number of submarine cables 42 to a Control Center 51 where this electricity is processed and routed to an electric motor 43 coupled with a water pump 44 which will send sea water 45, through pipe 55 to a reservoir 47 constructed on top of a tall building 57. The seawater 45 will be withdrawn through an intake pipe 54, and the water turbine-generator 49 will discharge the sea water through an outflow pipe 56 into the sea. This scheme shows an auxiliary system composed of solar panels 58 that will generate electricity to an electric motor 59 coupled with a water turbine 60 that will supply additional seawater to the reservoir 47. The seawater 45 to this auxiliary system is withdrawn through an additional intake pipe 61. This scheme also shows a back-up generator 62 in case there is a failure of the whole system.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An ocean wave-crest powered electrical generating system comprising:
   a buoyant vessel having a V-shaped hull having a bow section and a stern section, and a deck;
   a watertight compartment formed within said hull at said stern section, and a deck cover removably attached to said deck by mechanical fasteners providing access to said watertight compartment;
   said vessel anchored to the sea floor by mooring chains, including a pair of bow mooring chains connected to the vessel in spaced relation at the bow section, and a stern mooring chain connected to the vessel at the stern section, with the bow section thereof facing incoming waves;
   said bow section including a wave crest intake opening defined by an inclined intake ramp, a pair of opposing side panels, and an upper deflecting panel;
   a paddle wheel disposed on the aft-side of said intake opening, said paddle wheel being rotatably mounted to said vessel, said paddle wheel having angulated blades, each blade formed of a monolithic blade member having a radially inner portion and a radially outer portion forming an obtuse angle therebetween, each blade being configured, when disposed at the lowermost position, with said radially outer portion disposed vertically and said radially inner portion extending in a vertical and forward direction relative to said radially inner portion;
   said paddle wheel having an output shaft;
   a watertight enclosure affixed to said vessel, said enclosure including an access door with a peripheral gasket affixed thereto;
   said output shaft extending into said enclosure and configured to provide input power to a speed-increasing drive belt and pulley system disposed within said enclosure;
   said speed-increasing belt and pulley system configured to provide output power to an electrical generator disposed below said deck within said watertight compartment;
   a flywheel mechanically connected to said electrical generator;
   said electrical generator having an electric power outlet;
   a submarine electrical power transmission cable having a first end in electrical communication with said electric power outlet, and a second end;
   a water pump electrically connected to the second end of said cable, said water pump having a water inlet in fluid communication with a body of open water, and an outlet in fluid communication with an elevated reservoir; and
   said reservoir including a penstock for conveying water to a turbine-generator, whereby said turbine-generator generates electrical power.

2. The ocean wave-crest powered electrical generating system according to claim 1, wherein electrical power generated by said turbine is distributed to power lines via a control center.

\* \* \* \* \*